No. 747,260. PATENTED DEC. 15, 1903.
F. STELTZ.
MEAT TENDERER.
APPLICATION FILED APR. 6, 1903.
NO MODEL.
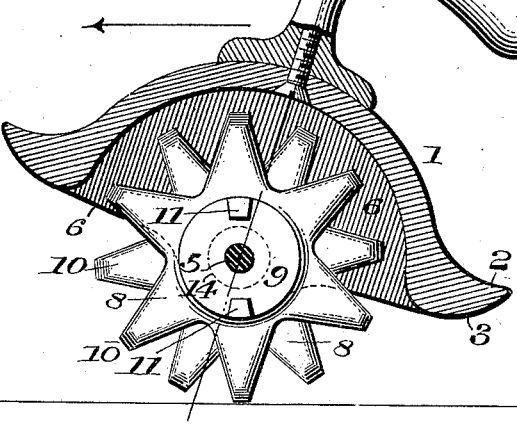
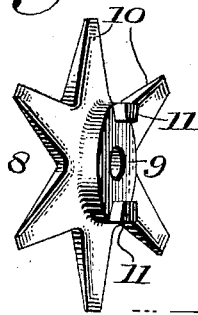
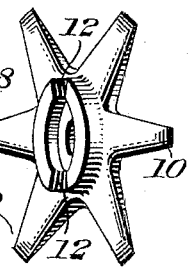
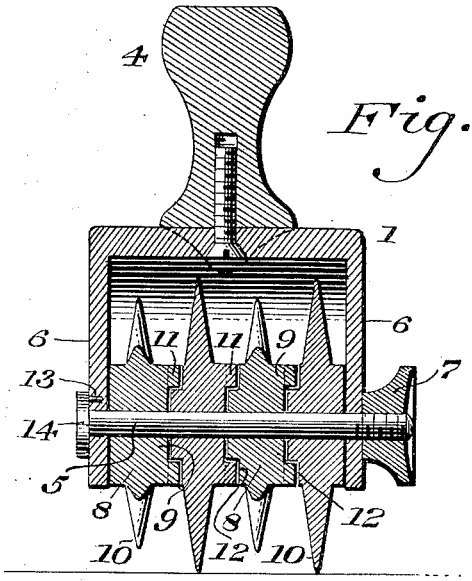
Witnesses
Inventor
Franklin Steltz No. 747,260. Patented December 15, 1903.

UNITED STATES PATENT OFFICE.

FRANKLIN STELTZ, OF POTTSTOWN, PENNSYLVANIA, ASSIGNOR TO MARY K. STELTZ, OF POTTSTOWN, PENNSYLVANIA.

MEAT-TENDERER.

SPECIFICATION forming part of Letters Patent No. 747,260, dated December 15, 1903.

Application filed April 6, 1903. Serial No. 151,224. (No model.)

*To all whom it may concern:*

Be it known that I, FRANKLIN STELTZ, a citizen of the United States, residing at Pottstown, in the county of Montgomery, State of Pennsylvania, have invented a new and useful Improvement in Meat-Tenderers, of which the following is a specification.

My invention relates to a meat-tenderer of the rotary type wherein a suitable casing is employed, the same having members or portions of such shape that the meat is not injured or caused to curl up while being subjected to the action of the tenderer, the cutters being also adapted to be readily removed for the purposes of inspection, cleaning, or repairs, and provision is also made for enabling the contiguous cutters to interlock with each other, so that all of the cutters rotate in unison and the teeth thereof are disposed in staggered order.

It further consists of novel details of construction, as will be hereinafter fully set forth and claimed.

Figure 1 represents a side elevation, partly in section, of a meat-tenderer embodying my invention. Fig. 2 represents a section on line *x x*, Fig. 1. Figs. 3 and 4 represent perspective views of the cutters in detached positions.

Similar numerals of reference indicate corresponding parts in the figures.

Referring to the drawings, 1 designates a casing which is preferably formed with a curved upper side and the edges 2 of which are upwardly curved, forming shoulders 3, the lower portions of which are also slightly curved upwardly, said casing having the handle 4 suitably secured thereto.

5 designates a shaft which passes across the casing and is suitably mounted in the side walls 6 thereof and is secured in position by the thumb-nut 7. Mounted on said shaft are the cutting-wheels 8, which are provided with the body portion 9, from which project the cutters 10. One side of the body portion of each cutter-wall is provided with lugs 11, while the opposite side of the body portion is provided with the notches 12, it being seen that the said lugs on one cutter-wheel are adapted to enter the notches on the next adjacent wheel, so that said wheels will be locked with respect to each other, and it will be further noted that the said cutters 10 are so arranged with respect to the position in which the cutter-wheels are locked that the cutters on one wheel are in staggered position with respect to the cutters on the next adjacent cutter-wheel. It will be seen that the shoulders or end portion 3 of the casing prevents the meat or other article from being injured or caused to curl up during the application of the tenderer, since the same can rest on the article, while at the same time the staggered order of the cutter-teeth operate in a very efficient manner. The parts can be quickly and easily removed for inspection, cleansing, or other purposes. In order to prevent the rotation of the shaft 5, I may employ a pin 13, mounted on the head 14 of the shaft, which enters a suitable opening in the casing. It will of course be understood that no lugs or notches are required on those faces of the cutters which are adjacent the casing, as is clearly shown in Fig. 2. It will be further noticed that the shoulders 3 are in a transverse plane with respect to the plane of rotation of the cutter-wheels, and that the said shoulders are situated below the upper edges of the cutters, and that the edge 15 of the shoulders is curved in order to prevent any portion of the article from being caught between said edge and the cutters.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. A meat-tenderer consisting of a casing having an internal concave portion and depending side walls, a shaft secured in said side walls, a plurality of cutters mounted on said shaft within said casing, said cutters having projecting portions arranged in staggered order and interlocking devices common to the contiguous faces of each pair of cutters whereby the cutting portions are adapted to always be retained in staggered order.

2. A meat-tenderer comprising a casing having an inner concave portion and depending side walls, a shaft detachably secured in said side walls, means for preventing said shaft from turning, a plurality of cutters mounted on said shaft and provided with projecting portions arranged in staggered order, lugs on one side of said cutters and recesses on the opposite side of said cutters, said recesses and lugs being adapted to interlock whereby the staggered relation of the cutting devices is always maintained.

3. A meat-tenderer consisting of a casing having a concave inner portion and depending side walls, a shaft mounted in said side walls, a laterally-extending flange on the front and rear portions of said casing, whereby the meat to be treated is always retained in flattened position, a plurality of cutters mounted on said shaft and having their projecting portions arranged in staggered order and interlocking devices common to said cutters.

4. A meat-tenderer comprising a casing consisting of top and side walls, a handle secured in said top wall, a shaft detachably secured in said side walls and a plurality of toothed cutters within said casing and mounted on said shaft, said casing covering substantially the upper half of all of said cutters, whereby the hand of the operator is protected from laceration.

5. A meat-tenderer comprising an integral casing consisting of top and side walls, a handle secured in said top wall, a shaft detachably secured in said side walls and a plurality of toothed cutters within said casing and mounted on said shaft, said casing being of substantially semicylindric form and covering the upper half of all of said cutters, whereby the hand of the operator is protected from laceration.

6. A meat-tenderer comprising a casing consisting of top and side walls, a handle secured in said top wall, a shaft detachably secured in said side walls and a plurality of toothed cutters within said casing and mounted on said shaft, said casing being substantially in the form of a semicylinder with laterally-extending flanges and covering the upper half of all of said cutters whereby the hand of the operator is protected from laceration.

7. A meat-tenderer comprising a plurality of rotary toothed cutters, a shaft on which said cutters are mounted, a casing of substantially semicylindrical cross-section engaging said shaft and inclosing the upper portion of said cutters, and laterally-extending flanges having curved lower faces on said casing substantially parallel with said shaft.

FRANKLIN STELTZ.

Witnesses:
JOHN A. WIEDERSHEIM,
WM. CANER WIEDERSHEIM.